(12) United States Patent
Nomura

(10) Patent No.: US 7,306,261 B2
(45) Date of Patent: Dec. 11, 2007

(54) SEATBELT APPARATUS

(75) Inventor: Yasuaki Nomura, Ibaragi (JP)

(73) Assignee: Takata Corporation, Tokyo (JP)

( * ) Notice: Subject to any disclaimer, the term of this patent is extended or adjusted under 35 U.S.C. 154(b) by 206 days.

(21) Appl. No.: 11/272,975

(22) Filed: Nov. 15, 2005

(65) Prior Publication Data

US 2006/0118674 A1 Jun. 8, 2006

(30) Foreign Application Priority Data

Dec. 2, 2004 (JP) ............................. 2004-350440

(51) Int. Cl.
*B60R 22/08* (2006.01)

(52) U.S. Cl. ................ 280/803; 280/807; 242/374; 242/375

(58) Field of Classification Search .............. 280/803, 280/806, 807; 242/374, 375, 389, 390
See application file for complete search history.

(56) References Cited

U.S. PATENT DOCUMENTS

| | | | |
|---|---|---|---|
| 6,360,981 | B1 | 3/2002 | Specht |
| 2004/0021029 | A1 | 2/2004 | Eberle et al. |
| 2005/0061904 | A1* | 3/2005 | Inuzuka et al. ........... 242/379.1 |
| 2006/0097099 | A1* | 5/2006 | Nomura ...................... 242/374 |
| 2006/0113418 | A1* | 6/2006 | Nomura ...................... 242/374 |
| 2006/0113419 | A1* | 6/2006 | Nomura ...................... 242/374 |
| 2006/0113420 | A1* | 6/2006 | Nomura ...................... 242/374 |
| 2006/0119091 | A1* | 6/2006 | Takao et al. .............. 280/801.1 |
| 2006/0226274 | A1* | 10/2006 | Nomura ................... 242/379.1 |
| 2006/0237570 | A1* | 10/2006 | Takao et al. ................ 242/374 |
| 2006/0243847 | A1* | 11/2006 | Nomura ..................... 242/390 |
| 2006/0249615 | A1* | 11/2006 | Mori et al. ................. 242/374 |
| 2006/0267331 | A1* | 11/2006 | Tanaka ....................... 280/806 |
| 2007/0029429 | A1* | 2/2007 | Nomura ...................... 242/374 |
| 2007/0075173 | A1* | 4/2007 | Boelstler et al. ............ 242/379 |

FOREIGN PATENT DOCUMENTS

| | | |
|---|---|---|
| DE | 43 32 205 A1 | 3/1995 |
| DE | 100 52 112 A1 | 5/2002 |
| EP | 1 223 089 A2 | 7/2002 |
| JP | 1-123759 U | 8/1989 |

* cited by examiner

*Primary Examiner*—Paul N. Dickson
*Assistant Examiner*—Toan C. To
(74) *Attorney, Agent, or Firm*—Foley & Lardner LLP

(57) ABSTRACT

A seatbelt retractor includes a spool formed into a hollow cylindrical shape and capable of winding a seatbelt onto a spool outer periphery or unwinding the seatbelt from the spool outer periphery. The retractor includes a motor accommodated in a cylindrical space of the spool and a motor speed-reduction mechanism configured to reduce the rotational speed of the motor via a plurality of gears. A controller is provided to control the operation of the motor.

13 Claims, 3 Drawing Sheets

SEATBELT APPARATUS

BACKGROUND

The present invention relates to a technology for developing a seatbelt retractor to be installed in a vehicle.

Conventionally, a seatbelt apparatus is known, which is structured to protect an occupant in a vehicle by a seatbelt (webbing) restraining the occupant. For example, PCT international application No. 2003-507252 (incorporated by reference herein) discloses a structure of a seatbelt retractor of a seatbelt apparatus, in which a spool (winding shaft) can be rotated in a belt-winding direction or a belt-unwinding direction for a seatbelt by an electric motor.

SUMMARY

One embodiment of the invention relates to a seatbelt retractor. The seatbelt retractor comprises a spool formed into a hollow cylindrical shape and capable of winding a seatbelt onto a spool outer periphery or unwinding the seatbelt from the spool outer periphery; a motor accommodated in a cylindrical space of the spool and capable of rotating the spool in the belt winding direction or the belt unwinding direction; a motor speed-reduction mechanism configured to reduce the rotational speed of the motor via a plurality of gears between the driving shaft of the motor and the spool; and a control mechanism configured to control the operation of the motor. A motor housing of the motor extends in the width direction of the spool outer periphery such that the axial direction of the motor coincides with the width direction of the spool outer periphery. The ratio of the outside diameter $D1$ of the motor housing relative to the outside diameter $D2$ of the spool outer periphery, ($D1/D2$), is 0.8 or less.

Another embodiment of the invention relates to a seatbelt apparatus. The seatbelt apparatus comprises a seatbelt retractor, and a seatbelt to be worn by a vehicle occupant seated in a seat. The seatbelt retractor comprises a spool formed into a hollow cylindrical shape and capable of winding the seatbelt onto a spool outer periphery or unwinding the seatbelt from the spool outer periphery; a motor accommodated in a cylindrical space of the spool and capable of rotating the spool in the belt winding direction or the belt unwinding direction; a motor speed-reduction mechanism configured to reduce the rotational speed of the motor via a plurality of gears between the driving shaft of the motor and the spool; and a control mechanism configured to control the operation of the motor. A motor housing of the motor extends in the width direction of the spool outer periphery such that the axial direction of the motor coincides with the width direction of the spool outer periphery. The ratio of the outside diameter $D1$ of the motor housing relative to the outside diameter $D2$ of the spool outer periphery of the spool, ($D1/D2$), is 0.8 or less.

Another embodiment of the invention relates to a vehicle. The vehicle comprises a seatbelt apparatus with a seatbelt retractor and a seatbelt to be worn by a vehicle occupant seated in a seat. The seatbelt retractor comprises a spool formed into a hollow cylindrical shape and capable of winding the seatbelt onto a spool outer periphery or unwinding the seatbelt from the spool outer periphery; a motor accommodated in a cylindrical space of the spool and capable of rotating the spool in the belt winding direction or the belt unwinding direction; a motor speed-reduction mechanism configured to reduce the rotational speed of the motor via a plurality of gears between the driving shaft of the motor and the spool; and a control mechanism configured to control the operation of the motor. A motor housing of the motor extends in the width direction of the spool outer periphery such that the axial direction of the motor coincides with the width direction of the spool outer periphery. The ratio of the outside diameter $D1$ of the motor housing relative to the outside diameter $D2$ of the spool outer periphery of the spool, ($D1/D2$), is 0.8 or less. The seatbelt apparatus is accommodated in an accommodating space in the vehicle.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
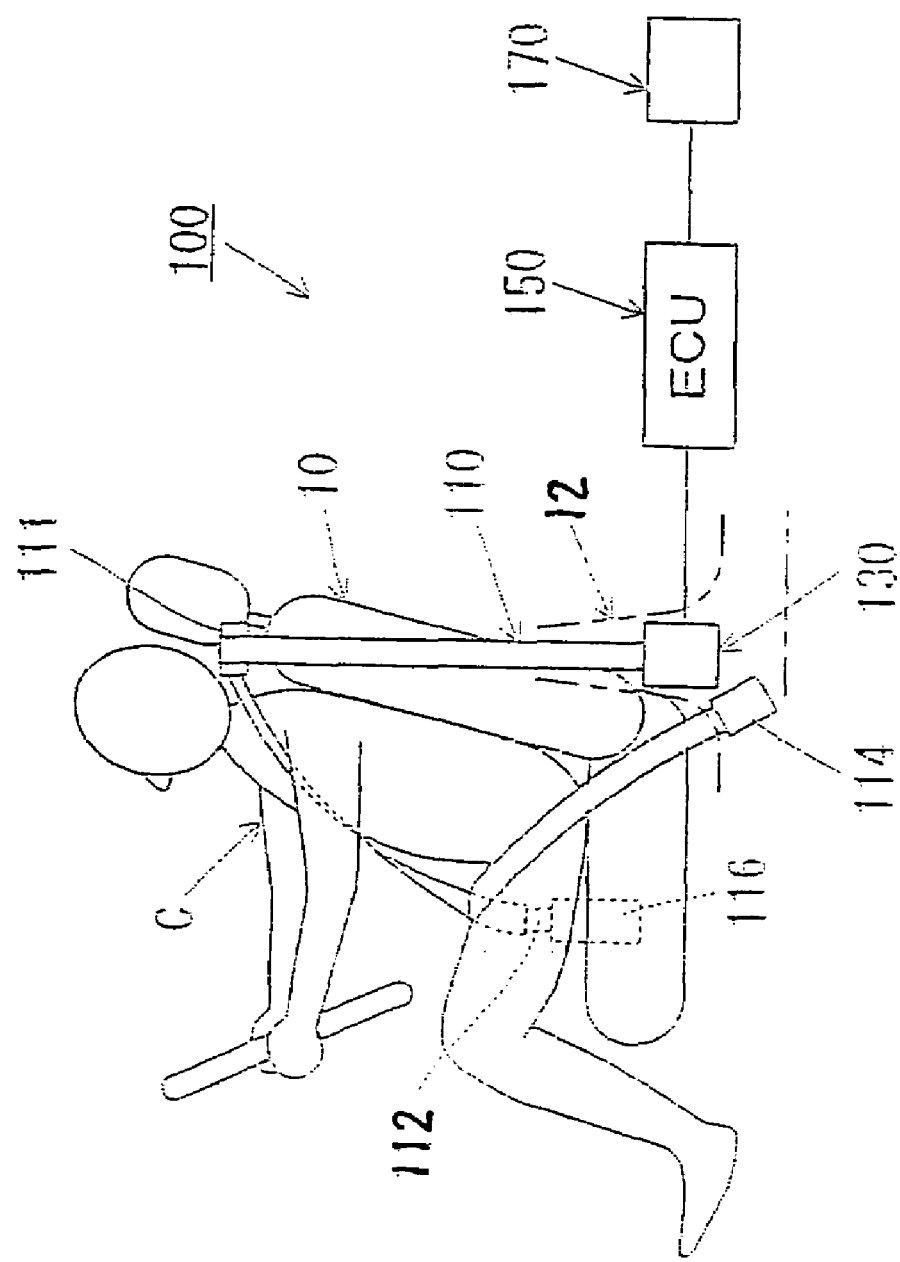
FIG. 1 shows a schematic structure of a seatbelt apparatus, which is installed in a vehicle, according to an embodiment of the present invention.

The technology described in PCT international application No. 2003-507252 gives us a possibility of using an electric motor to conduct the action of the spool for winding or unwinding the seatbelt, as a structure of the seatbelt retractor. With regard to the design of such seatbelt apparatuses, further technical requirement exists for reducing the size of the seatbelt retractor to correspond to the configuration of a pillar or the like as a narrow space for accommodating the seatbelt retractor.

Therefore, embodiments of the present invention have been made in view of the above requirement and it is an object of the present invention to provide a technology effective for the miniaturization of a seatbelt retractor to be installed in a vehicle.

Embodiments of the present invention can be typically adapted to a seatbelt retractor to be installed in a vehicle. Embodiments of the present invention can be applied to a technology for a seatbelt retractor to be installed in a vehicle other than the vehicle.

The seatbelt retractor of a first embodiment comprises at least a spool, a motor, a motor speed-reduction mechanism, and a control mechanism.

The spool of this embodiment is a member which is formed into a hollow cylindrical shape and is capable of winding a seatbelt onto a spool outer periphery thereof or unwinding the seatbelt from the spool outer periphery. The spool outer periphery is adapted to be a surface with which the seatbelt is in contact. The seatbelt is a long belt to be worn by a vehicle occupant seated in a seat and is sometimes called "webbing". Typically, the vehicle occupant seated in the vehicle seat is restrained by the seatbelt when restraint is required such as a vehicle collision, thereby ensuring the protection of the vehicle occupant.

The motor of this embodiment is a motor which is accommodated in the cylindrical space of the spool and has a function of rotating the spool in the belt winding direction or the belt unwinding direction.

The motor speed-reduction mechanism has a function of reducing the rotational speed of the motor via a plurality of gears between the driving shaft of the motor and the spool.

The control mechanism of this embodiment is a mechanism for controlling the operation (the rotational speed, the rotational direction) of the motor. The control mechanism is typically composed of a CPU (central processing unit), an input/output unit, a storage unit, a peripheral unit, and the like.

In this embodiment, a motor housing of the motor extends in the axial direction which is equal to the width direction of the spool outer periphery of the spool in the state that the motor is accommodated and the ratio of the outside diameter D1 of the motor housing relative to the outside diameter D2 of the spool outer periphery of the spool, (D1/D2), is set to be 0.8 or less. Since the size of the seatbelt retractor in the width direction, the size of the motor housing of the axial direction, and the size of the spool outer periphery of the spool in the width direction are equal to each other, the reduction in size and the reduction in weight of the retractor can be achieved by suitably setting the relative size relating to the radial direction (proportion in outside diameter) between the motor and the spool.

According to the structure of this embodiment in which the spool is rotated by the motor, a spring mechanism for biasing the spool in the belt winding direction can be eliminated. The spring mechanism is generally located adjacent to the spool in the width direction of the spool. Therefore, the elimination of the spring mechanism reduces the size relating to the width direction of the spool, thereby enabling the further reduction in overall size of the seatbelt retractor.

According to the structure of this embodiment in which the motor is accommodated in the cylindrical space of the spool, the reduction in size and the reduction in weight of the seatbelt retractor are achieved and, in addition, the noise insulation and the electromagnetic-wave shielding in the operation of the motor are improved.

In the seatbelt retractor of a second embodiment, the ratio (D1/D2) as in the first embodiment is set to satisfy $0.7 \leq (D1/D2) \leq 0.75$. This structure enables to further reduce the size and the weight of the seatbelt retractor. In another embodiment, the ratio can be in the range of 0.75 to 0.79. In another embodiment, the ratio can be in the range of 0.6 to 0.75.

In the seatbelt retractor of a third embodiment, the gears of the motor speed-reduction mechanism as in the first or second embodiment are arranged to extend on the same plane perpendicular to the axial direction of the motor housing. According to this structure, the size relating to the axial direction of the motor speed-reduction mechanism can be reduced by arrangement of the plural gears, thereby further reducing the overall size relating to the axial direction of the retractor including the motor speed-reduction mechanism. Therefore, the further reduction in size of the seatbelt retractor to be installed in the vehicle is achieved.

The seatbelt retractor of a fourth embodiment has the same or similar structure as in any one of the first through third embodiments and is adapted such that the spool and the motor housing are supported by each other via at least a bearing mechanism disposed between the inner periphery of the spool and the outer periphery of the motor housing. For composing the suitable bearing structure, the present invention allows the adoption of another bearing mechanism in addition to the bearing mechanism disposed between the inner periphery of the spool and the outer periphery of the motor housing, if necessary. According to this structure, the rotation of the spool relative to the motor housing is allowed by the bearing structure with simple structure.

The seatbelt retractor of a fifth embodiment has the same or similar structure as in any one of the first through fourth embodiments and is adapted to have such dimensions as to be used for a passenger in a rear seat of a vehicle. According to this structure, a seatbelt retractor having reduced size is provided. The seatbelt retractor having the aforementioned dimensional structure can be accommodated in a relatively narrow area in a vehicle for the purpose of use by a passenger in a rear seat of a vehicle. Though the seatbelt retractor has reduced size for the passenger in the rear seat, the seatbelt retractor can be, of course, accommodated in the vehicle for the purpose of use by a driver or a passenger in a front seat.

The seatbelt retractor of a sixth embodiment has the same or similar structure as in any one of the first through the fourth embodiments and is adapted to be accommodated in an accommodating space in a rear pillar of a vehicle which is located on the rear side of the A-pillar of the vehicle. The "rear pillar" used here corresponds to a B-pillar or a C-pillar in case of a vehicle having two rows of seats or corresponds to a B-pillar, a C-pillar, or a D-pillar in case of a vehicle having three rows of seats. This structure enables to provide a compact seatbelt retractor which can be accommodated in the accommodating space of the rear pillar of which size is limited.

The seatbelt retractor of a seventh embodiment has the same or similar structure as in any one of the first through fourth embodiments and is adapted to be accommodated in an accommodating space in a seat of a vehicle. The "seat" used here widely includes a driver's seat and a passenger's seat in a first-row, and second- and third-row seats. This structure enables to provide a compact seatbelt retractor which can be accommodated in the accommodating space of the seat of which size is limited.

The seatbelt retractor of an eighth embodiment has the same or similar structure as in the sixth or seventh embodiments and is adapted such that, in the state that the seatbelt retractor is accommodated in the accommodating space, the spool outer periphery of the spool extends in the longitudinal direction of a vehicle, and the size of the spool outer periphery in the width direction and the size of the accommodating space in the rear pillar or the accommodating space in the seat in the longitudinal direction of the vehicle are equal to each other. This structure enables to provide a compact seatbelt retractor which can be accommodated in the accommodating space in the rear pillar of which size is limited in the longitudinal direction of the vehicle or in the accommodating space of the seat of which size is limited.

A seatbelt apparatus of a ninth embodiment is a seatbelt apparatus comprising at least a seatbelt retractor as in any one of the first through eighth embodiments, and a seatbelt to be worn by a vehicle occupant seated in a seat and which can be wound onto or unwound from a spool outer periphery of a spool of the seatbelt retractor.

According to this structure, the reduction in size and the reduction in weight of the seatbelt retractor enable the reduction in size and the reduction in weight of the seatbelt apparatus to be installed in the vehicle. Accordingly, the degree of freedom of location of the seatbelt apparatus in the vehicle is increased.

A vehicle with a seatbelt apparatus of a tenth embodiment is a vehicle in which the seatbelt apparatus is that of the ninth embodiment and is accommodated in an accommodating space in a vehicle such as an accommodating space in a pillar, an accommodating space in a seat, or an accommodating space in another part of the vehicle. This structure enables to provide a vehicle in which a miniaturized seatbelt apparatus is accommodated in an accommodating space in the vehicle.

As described in the above, embodiments of the present invention can provide a technology, particularly relating to the structure of a seatbelt retractor, which is effective for the reduction in overall size of the seatbelt retractor to be installed in a vehicle. According to the technology, the overall size of the seatbelt retractor is reduced by suitably setting the relative size relating to the radial direction (proportion in the outside diameter) between a motor and a spool.

Hereinafter, embodiments of the present invention will be described in detail with reference to drawings. First, description will be made as regard to the structure of a seatbelt apparatus 100 as one of embodiments of "seatbelt apparatus" according to the present invention with reference to FIG. 1 through FIG. 3.

The schematic structure of the seatbelt apparatus 100, which is installed in a vehicle, of the embodiment according to the present invention is shown in FIG. 1.

As shown in FIG. 1, the seatbelt apparatus 100 of this embodiment is a seatbelt apparatus for a vehicle to be installed in an automotive vehicle as "a vehicle with a seatbelt apparatus" and mainly consists of a seatbelt 110, a retractor 130, and an ECU 150. In addition, an input element 170 is installed in the vehicle to detect information about collision prediction or collision occurrence of the vehicle, information about the driving state of the vehicle, information about the sitting position and the body size of a vehicle occupant seated in a vehicle seat, information about traffic conditions around the vehicle, information about weather condition and about time zone, and the like and to input such detected information to the ECU 150. The detected information of the input element 170 is transmitted to the ECU 150 anytime or at predetermined intervals and is used for the operation control of the seatbelt apparatus 100 and the like.

The seatbelt 110 is a long belt (webbing) to be used for restraining and canceling the restraint of a vehicle occupant C seated in a vehicle seat 10 as a driver's seat (corresponding to the "seat" of embodiments of the present invention). The seatbelt 110 is withdrawn from the retractor 130 fixed to the vehicle and extends through a deflection fitting 111 provided around an area about the shoulder of the vehicle occupant C and is connected to an outer anchor 114 through a tongue 112. The deflection fitting 111 has a function of holding the seatbelt 110 to the area about the shoulder of the occupant C and guiding the seatbelt 110. By inserting the tongue 112 to a buckle 116 fixed to the vehicle body, the seatbelt 110 becomes into the state worn by the vehicle occupant C. The seatbelt 110 corresponds to the "seatbelt" of embodiments of the present invention.

The retractor 130 is a device capable of performing the action of winding or unwinding the seatbelt 110 by a spool 132 as will be described later and corresponds to the "seatbelt retractor" of embodiments of the present invention. The retractor 130 is installed in an accommodating space in a B-pillar 12 of the vehicle in the embodiment shown in FIG. 1.

The ECU 150 has a function of conducting the control of the retractor 130 and other operational mechanisms based on the input signals from the input element 170 and comprises a CPU (Central processing unit), an input/output unit, a storage unit, a peripheral unit, and the like. Particularly in this embodiment, the ECU 150 controls a motor 133, as will be described later, of the retractor 130. Specifically, the ECU 150 controls the amount of electricity supplied to an electromagnetic coil (value of current and value of voltage in the electromagnetic coil) of the motor 133 and the direction of the electricity (energization direction in the electromagnetic coil) so as to vary the rotational speed or the rotational direction of a shaft of the motor 133. The ECU 150 corresponds to the "control mechanism" of the present invention.

Figure 2:
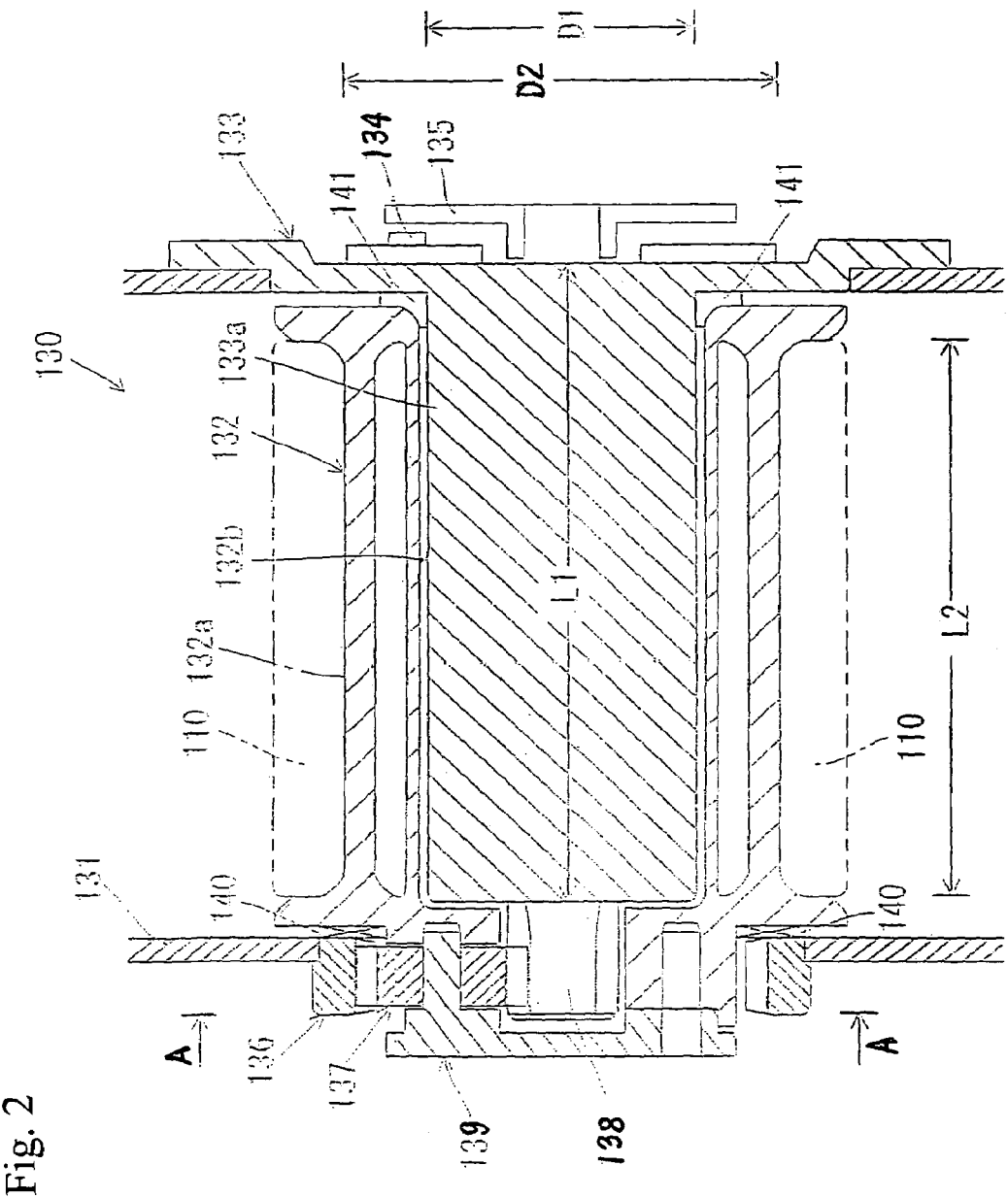
FIG. 2 is a sectional view of a retractor shown in FIG. 1.
Figure 3:
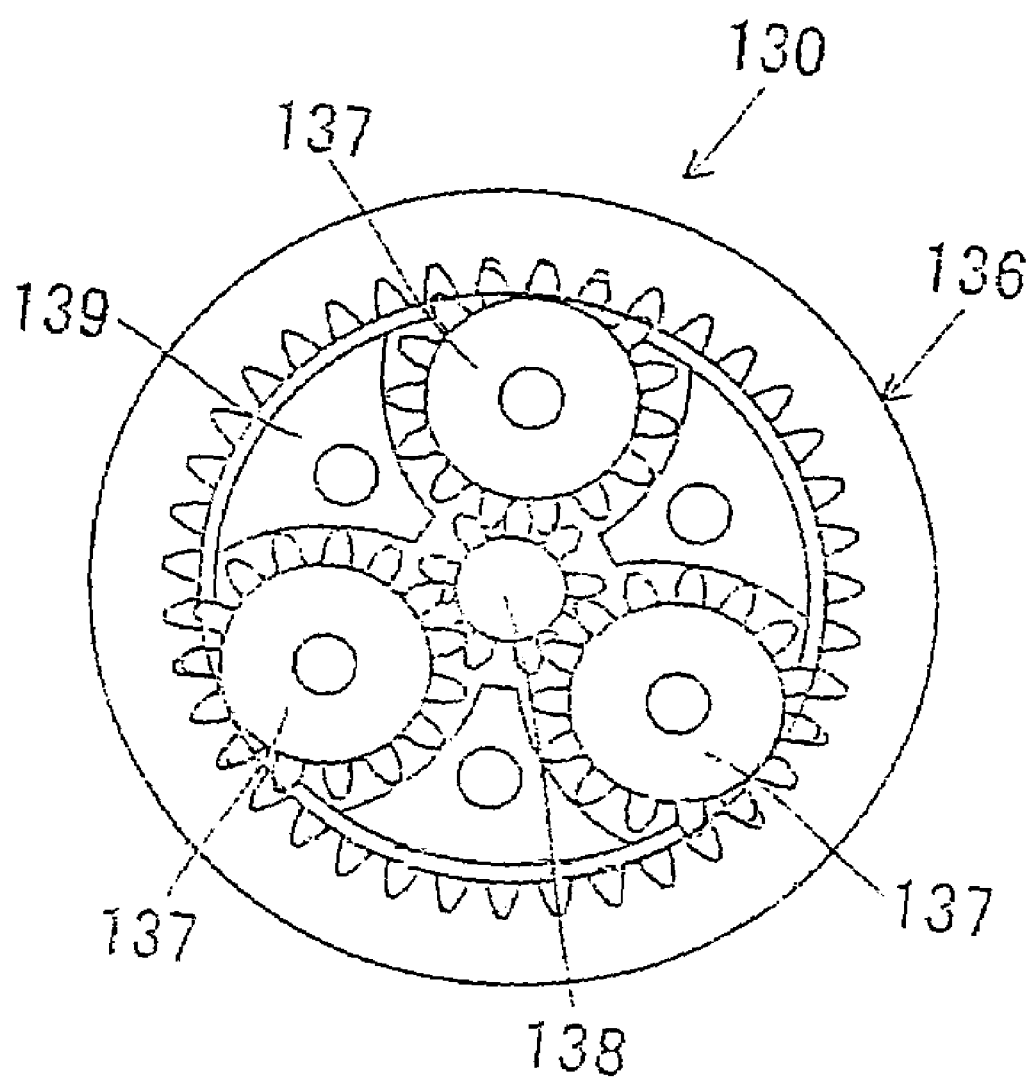
FIG. 3 is a sectional view on arrows of a line A-A of the retractor shown in FIG. 2.

Referring to FIG. 2 and FIG. 3, the retractor 130 will be described in detail. FIG. 2 is a sectional view of the retractor 130 shown in FIG. 1 and FIG. 3 is a sectional view on arrows of a line A-A of the retractor 130 shown in FIG. 2.

As shown in FIG. 2, the retractor 130 of this embodiment comprises a base frame (retractor body frame) 131, which is fixed to the vehicle body, and further comprises the spool (winding shaft) 132, the motor 133, a Hall sensor 134, a magnetic disc 135, an internal gear 136, planetary gears 137, a sun gear 138, a carrier 139, and bearings 140, 141 which are assembled to the base frame 131.

The spool 132 of the retractor 130 is a member rotatably supported to the base frame 131 and corresponds to the "spool" of embodiments of the present invention. Specifically, the bearing 140 lies between the spool 132 and the internal gear 136 which is a fixed member and the bearing 141 lies between the spool 132 and the body of the motor 133 which is a fixed member, whereby the spool 132 is rotatable relative to the fixed members. That is, the spool 132 and a motor housing 133a of the motor 133 are supported by each other via the bearing mechanism (bearing 140) disposed between the outside surface of the spool and the inside surface of the internal gear and the bearing mechanism (bearing 141) disposed between the inner periphery of the spool and the outer periphery of the motor housing. According to this structure, the rotation of the spool 132 relative to the motor housing 133a is allowed by simple bearing structure.

In the retractor 130, the seatbelt 110 is wound onto a spool outer periphery 132a of the spool 132 or the seatbelt 110 is unwound from the spool outer periphery 132a of the spool 132. That is, the spool outer periphery 132a of the spool 132 is a surface with which the seatbelt 110 is in contact. The shaft of the motor 133 is rotated in one direction so as to conduct operation of unwinding the seatbelt 110 from the spool 132, while the shaft of the motor 133 is rotated in the other direction so as to conduct operation of winding the seatbelt 110 onto the spool 132. Details about this will be described later.

According to the structure of rotating the spool 132 by the motor 133 such as this embodiment, a spring mechanism for biasing the spool 132 in the belt winding direction can be eliminated. The spring mechanism is generally located adjacent to the spool 132 in the width direction of the spool 132. Therefore, the elimination of the spring mechanism reduces the size relating to the width direction of the spool 132, thereby enabling the reduction in overall size of the retractor 130.

The spool 132 is formed into a hollow cylindrical shape of which one end is closed and the other end is open. The motor 133 is inserted into of a cylindrical hollow space 132b through the open end and is accommodated in the hollow space 132b. In the state that the motor 133 is accommodated in the hollow space 132b of the spool 132, the motor housing 133a of the motor 133 extends along the axial direction of the motor 133 which extends along the width direction of the spool outer periphery 132a of the spool 132.

In the state that the motor 133 is accommodated, three dimensions, i.e., the size L1 of the motor housing 133a of the motor 133 in the axial direction, the size L2 of the spool outer periphery 132a of the spool 132 in the width direction, and the width of the seatbelt 110, are equal to each other. That is, in this embodiment, the size of the motor housing 133a in the axial direction and the size of the spool outer periphery 132a in the width direction are set to correspond to the standard width of the seatbelt 110. As shown in FIG. 2, in this embodiment, the overall size of the spool 132 in the width direction is nearly equal to the size of the spool outer periphery 132 in the width direction. That is, the four dimensions, i.e. the overall size of the spool 132 in the width direction, the size L1 of the motor housing 133a in the axial direction, the size L2 of the spool outer periphery 132a in the width direction, and the width of the seatbelt 110 are equal to each other.

According to this structure, the width of the spool 132 can be reduced to correspond to the size of the motor housing 133a in the axial direction, thereby reducing the overall size relating to the axial direction of the retractor 130. Therefore, the miniaturization of the retractor 130 and the seatbelt apparatus 100 to be installed in the vehicle is achieved, thereby increasing the degree of freedom of location of the seatbelt retractor 130 and the seatbelt apparatus 100 in the vehicle. The motor housing 133a is designed to have the maximum size in the axial direction within the range of the width of the spool 132, allowing the use of a motor with higher output.

According to the structure of this embodiment that the motor 133 is accommodated in the cylindrical space of the spool 132, the reduction in size and the reduction in weight of the retractor 130 are achieved and, in addition, the noise insulation and the electromagnetic-wave shielding in the operation of the motor are improved.

In this embodiment, the ratio of the outside diameter D1 of the motor housing 133a of the motor 133 relative to the outside diameter D2 of the spool outer periphery 132a of the spool 132, i.e. D1/D2, is preferably set to be 0.8 or less, particularly set to satisfy $0.7 \leq D1/D2 \leq 0.75$. The ratio (D1/D2) can be suitably set within a range of $(D1/D2) \leq 0.8$, particularly within a range of $0.7 \leq (D1/D2) \leq 0.75$. For example, the outside diameter D1 of the motor 133 may be 40 (mm) and the outside diameter D2 of the spool outer periphery 132a of the spool 132 may be 55 (mm). In this case, the ratio (D1/D2) is about 0.73. According to this structure, the size of the spool 132 in the radial direction can be reduced to correspond to the size of the motor 133 in the radial direction, thereby enabling the reduction in overall size relating to the radial direction of the retractor 130.

Further, the spool 132 of this embodiment defines the substantial outer profile of the retractor 130 and forms a "seatbelt retractor housing" in which at least main components of the spool such as the motor 133 are accommodated. In this embodiment, the correlation among the volume V1 of the motor housing 133a of the motor 133 (i.e., volume occupied by the motor housing 133a), the volume V2 of the cylinder portion of the spool 132, and the storage volume V3 within the seatbelt retractor housing is set to achieve the equation $V3 < V1+V2$. In this embodiment, the volume V2 of the spool 132 substantially coincides with the storage volume V3 within the seatbelt retractor housing. The storage volume V3 within the seatbelt retractor housing is defined as the volume of the inner space of a roll formed by the seatbelt in the wound-up state. The setting range of these volume is defined as a retractor miniaturization adjustment range effective for reducing the size of the seatbelt retractor, taking the volumes relative to the spool and the motor into consideration. It is further preferable to achieve the equation $V3 < (V1+V2) \times N$, wherein $0.5 < N < 1$. For securely achieving the reduction in size and the reduction in weight of the retractor, the N in $V3 < (V1+V2) \times N$ is preferably in a range of $0.55 < N < 0.95$, more preferably $0.55 < N < 0.85$, especially preferably $0.55 < N < 0.75$.

In this embodiment, the ratio (V1/V2) of the volume V1 of the motor housing 133a of the motor 133 (i.e., volume occupied by the motor housing 133a) to the volume V2 of the cylinder portion of the spool 132 is set to be within a retractor miniaturization adjustment range (corresponding to the "retractor miniaturization adjustment range" of embodiments of the present invention) about the volume ratio in which the ratio (V1/V2) is 40 percent (about 0.4) or more and less than 100 percent (about 1).

The retractor miniaturization adjustment range as mentioned above is defined as a range effective for reducing the size of the seatbelt retractor 130, taking the volumes relative to the spool 132 and the motor of this embodiment into consideration. Specifically, as shown in FIG. 2, the size of the retractor 130 in the width direction is equal to the size L1 of the motor housing 133a in the axial direction and the size L2 of the spool outer periphery 132a of the spool 132 in the width direction. Therefore, by suitably setting the relative sizes of the spool 132 and the motor 133 in the radial direction, the relationship among the respective volumes corresponding to the retractor miniaturization adjustment range is substantially set. According to this structure, the miniaturization of the retractor is achieved. The seatbelt retractor 130 having the aforementioned dimensional structure according to this embodiment can be accommodated in a relatively narrow area of a vehicle for the purpose of use by a passenger in a rear seat of a sedan-type vehicle. Though the seatbelt retractor 130 has reduced size for the passenger in the rear seat, the seatbelt retractor 130 can be, of course, accommodated in the vehicle for the purpose of use by a driver or a passenger in a front seat.

The motor 133 of this embodiment is an electric motor of a type, so-called "brushless motor of inner rotor type". The motor 133 corresponds to the "motor" of the present invention. The motor 133 uses a magnet as a rotor and a coil as a stator which are accommodated in the motor housing 133a. The stator is disposed around the rotor. The motor 133 is structured such that the motor shaft is rotated according to the rotation of the rotor. In the motor 133, the Hall sensor (a magnetic position detector) 134 is mounted on a side of the motor housing 133a and the magnetic disc 135 is mounted on a side of the rotor. The Hall sensor 134 and the magnetic disc 135 cooperate together to detect the position of the rotor. From the information of the detection, the amount of winding or unwinding the seatbelt 110 is obtained. Based on the amount of winding or unwinding of the seatbelt 110, the rotational speed of the motor and the load of the motor can be controlled. In this embodiment, as mentioned above, a mechanism for detecting the position of the rotor in the motor 133 are also used as a mechanism for detecting the amount of winding or unwinding the seatbelt 110. Therefore, the use of the brushless motor such as the motor 133 can eliminate sensors for exclusive use of detecting the rotational speed and rotational direction of the rotor and of detecting the amount of winding or unwinding the seatbelt 110. This also provides economical advantage. The brushless motor such as the motor 133 is effective for reducing the size of the body, improving the output, and improving the heat radiation property.

As shown in FIG. 2 and FIG. 3, the shaft of the motor 133 is adapted to have the sun gear 138. Three planetary gears 137 mesh with the outer periphery of the sun gear 138. The outer peripheries of the planetary gears 137 mesh with inner periphery of the internal gear 136. That is, a gear train, so-called "planetary gear mechanism" is constructed in which the planetary gears 137 are arranged between the internal gear 136 and the sun gear 138. The internal gear 136 is fixed to the base frame 131. The planetary gears 137 are rotatably supported by the carrier 139 and the spool 132 is connected to the carrier 139. The internal gear 136, the planetary gears 137, the sun gear 138 compose together a speed-reduction mechanism (corresponding to the "motor speed-reduction mechanism" of embodiments of the present invention) of the motor 133. In this embodiment, the motor speed-reduction mechanism is located adjacent to the motor housing 133a relative to the axial direction of the motor housing 133a. Further in this embodiment, the plural gears composing the motor speed-reduction mechanism are arranged to extend on the same plane in a direction perpendicular to the axial direction of the shaft of the motor. According to the structure, the size relating to the axial direction of the motor speed-reduction mechanism can be reduced by arrangement of the plural gears, thereby further reducing the overall size relating to the axial direction of the retractor 130 including the motor speed-reduction mechanism. Therefore, the reduction in size of the retractor 130 and the seatbelt apparatus 100 to be installed in the vehicle is achieved.

In this embodiment, the three dimensions, i.e. the first size relating to the width direction of the spool outer periphery 132a, the second size which is the size relating to the axial direction of the motor housing 133a plus the size relating to the axial direction of the motor speed-reduction mechanism, and the width of the seatbelt 110 are equal to each other. That is, in this embodiment, the first size and the second size are set to correspond to the standard width of the seatbelt 110. As shown in FIG. 2, in this embodiment, the overall size of the spool 132 in the width direction is nearly equal to the size of the spool outer periphery 132a in the width direction. That is, the four dimensions, i.e. the overall size of the spool 132 in the width direction, the first size, the second size, and the width of the seatbelt 110 are equal to each other. According to this structure, the width of the spool 132 can be reduced to correspond to the size of the combination of the motor housing 133a with the motor speed-reduction mechanism in the axial direction, thereby reducing the overall size relating to the axial direction of the seatbelt retractor.

In this embodiment, the driving shaft (motor shaft) as the rotational axis of the motor 133, the spool shaft as the rotational axis of the spool 132, the speed-reduction shaft as the rotational axis of the sun gear 138 as one component of the speed-reduction mechanism are generally aligned in a straight line along the width direction of the spool outer periphery 132a. According to the structure, the simplification and miniaturization of the motor speed-reduction mechanism are achieved and the sizes relating to the radial direction of the motor 133, the spool 132, and the motor speed-reduction mechanism are reduced, thereby enabling the reduction in overall size and weight of the retractor.

In the aforementioned structure of the retractor 130, as the shaft of the motor 133 is rotated, the three planetary gears 137 meshing with the sun gear 138 move around the speed-reduction shaft of the sun gear 138 (the driving shaft of the motor 133), whereby the spool 132 rotates via the carrier 139. For example, when the sun gear 138 rotates about the speed-reduction shaft in the clockwise direction in FIG. 3, the three planetary gears 137 rotate about their axes in the counterclockwise direction and move around the sun gear 138 in the clockwise direction between the external teeth of the sun gear 138 and the internal teeth of the internal gear 136. On the other hand, when the sun gear 138 rotates about the speed-reduction shaft in the counterclockwise direction, the three planetary gears 137 rotate about their axes in the clockwise direction and move around the sun gear 138 in the counterclockwise direction between the external teeth of the sun gear 138 and the internal teeth of the internal gear 136. During this, the rotation of the motor 133 is transmitted to the spool 132 while the rotational speed is reduced to some fraction of the rotational speed of the motor and the torque is increased. By the rotational torque transmitted to the spool 132, the seatbelt 110 is wound onto or unwound from the outer periphery of the spool 132. According to this structure, the motor speed-reduction mechanism is simplified, thereby enabling the reduction in overall size and weight of the retractor.

In the seatbelt apparatus 100 having the aforementioned structure, the control of the operation of the motor 133 of the retractor 130 is used when the restraint of the vehicle occupant is conducted or when the restraint of the vehicle occupant is cancelled. The control is suitably conducted by the ECU 150 based on the input signals from the input element 170 shown in FIG. 1. That is, the seatbelt apparatus 100 of this embodiment has such a function that, based on the input signals from the input element 170, the ECU 150 controls the operation of the motor 133 to adjust the tension of the seatbelt 110 so as to control the condition about the restraint of the vehicle occupant and therefore composes an occupant restraining system for a vehicle. Specifically, the following first through fifth modes may be employed.

In the first mode (putting-on mode), the motor 133 is controlled to be rotated in the belt unwinding direction to facilitate the vehicle occupant to withdraw the seatbelt when the vehicle occupant inserts and latches the tongue 112 to the buckle 116 of the seatbelt 110 by his or her hand. Accordingly, the load and operation for withdrawing the seatbelt can be relieved.

In the second mode (fitting mode), the motor 133 is controlled to be rotated in the belt winding direction to apply predetermined tension on the seatbelt 110 in the state that the seatbelt is worn by the vehicle occupant. Accordingly, slack of the seatbelt generated when the seatbelt is withdrawn can be eliminated. If necessary, the motor 133 may be controlled to rotate a little in the belt winding direction or the belt unwinding direction to conduct fine adjustment for controlling comfort of the vehicle occupant wearing the seatbelt.

In the third mode (pre-rewinding (restraining) mode), the motor 133 is controlled to rotate in the belt winding direction to apply strong tension on the seatbelt 110 when the seatbelt is worn by the vehicle occupant. Accordingly, change in posture of the vehicle occupant due to a vehicle collision or emergency braking is inhibited so as to ensure the protection of the vehicle occupant.

In the fourth mode (warning mode), when danger or collision is predicted in the state the seatbelt is used, the motor 133 is controlled to rotate in the belt winding direction or the belt unwinding direction to change tension on the seatbelt 110 so as to urge the vehicle occupant to pay attention. For example, the operation of applying strong tension and weak tension onto the seatbelt 110 is repeated, thereby preventing the vehicle occupant from dozing and thus ensuring the collision prevention.

In the fifth mode (storing mode), the motor 133 is controlled to rotate in the belt winding direction to facilitate the vehicle occupant to store the seatbelt 110 after the vehicle occupant releases the latching of the tongue 112 from the buckle 116. Accordingly, the load and operation for storing the seatbelt can be relieved.

The present invention is not limited to the aforementioned embodiment, various variations and modifications may be made. For example, the following embodiments as variations of the aforementioned embodiment may be carried out.

Though the retractor 130 described in the above embodiment is used for the vehicle occupant seated in the driver's seat and is accommodated in the accommodating space in the B-pillar, embodiments of the present invention can be adopted to the structure of retractors for vehicle occupants seated in a passenger's seat and a rear seat. When embodiments of the present invention are adopted to the structure of a retractor for a vehicle occupant seated in the rear seat, the retractor is accommodated in an accommodating space in a C-pillar in case of a vehicle of a type having two rows of seats or the retractor is accommodated in an accommodating space in a C-pillar or a D-pillar in case of a vehicle of a type having three rows of seats. The accommodating space in the C-pillar or the D-pillar is often limited in the longitudinal direction of the vehicle. Especially in such case, a retractor having reduced size in the width direction such as the retractor 130 in the embodiment is effective.

Though the above embodiment has been described with regard to the case that the retractor 130 is accommodated in the accommodating space in the pillar, embodiments of the present invention can be adapted to the structure in which the retractor is accommodated in an accommodating space in a member other than the pillar. For example, a vehicle seat such as a driver's seat or a passenger's seat as a first-row seat, or a seat as a second- or third-row seat may be provided with an accommodating space inside thereof and the retractor 130 of the embodiment can be accommodated in the accommodating space inside the seat. The size of the seat is often limited in the longitudinal direction of the vehicle similarly to the vehicle pillar. Especially in this case, a retractor having reduced size in the width direction such as the retractor 130 in the embodiment is effective.

Though the above embodiment has been described with regard to the structure of the seatbelt apparatus to be installed in a vehicle, embodiments of the present invention can be adopted to seatbelt apparatuses to be installed in a wide variety of vehicles other than automobiles, such as aircraft, boats, and trains.

Japan Priority Application 2004-350440, filed Dec. 2, 2004 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seatbelt retractor comprising:
   a spool formed into a hollow cylindrical shape and capable of winding a seatbelt onto a spool outer periphery or unwinding the seatbelt from the spool outer periphery,
   a motor accommodated in a cylindrical space of the spool and capable of rotating the spool in the belt winding direction or the belt unwinding direction;
   a motor speed-reduction mechanism configured to reduce the rotational speed of the motor via a plurality of gears between the driving shaft of the motor and the spool; and
   a control mechanism configured to control the operation of the motor,
   wherein a motor housing of the motor extends in the width direction of the spool outer periphery such that the axial direction of the motor coincides with the width direction of the spool outer periphery, and
   wherein the ratio of the outside diameter D1 of the motor housing relative to the outside diameter D2 of the spool outer periphery, (D1/D2), is 0.8 or less.

2. The seatbelt retractor as claimed in claim 1, wherein the ratio (D1/D2) is set to satisfy $0.7 \leq (D1/D2) \leq 0.75$.

3. The seatbelt retractor as claimed in claim 1, wherein the ratio (D1/D2) is in the range of 0.75 to 0.79.

4. The seatbelt retractor as claimed in claim 1, wherein the ratio (D1/D2) is in the range of 0.6 to 0.75.

5. The seatbelt retractor as claimed in claim 1, wherein the plurality of gears of the motor speed-reduction mechanism are arranged to extend on the same plane perpendicular to the axial direction of the motor housing.

6. The seatbelt retractor as claimed in claim 1, wherein the spool and the motor housing are supported by each other via a bearing mechanism disposed between the inner periphery of the spool and the outer periphery of the motor housing.

7. The seatbelt retractor as claimed in claim 1, wherein the seatbelt retractor is adapted to have such dimensions as to be used for a passenger in a rear seat of a vehicle.

8. The seatbelt retractor as claimed in claim 1, wherein the seatbelt retractor is adapted to be accommodated in an accommodating space in a pillar of a vehicle which is located on the rear side of the A-pillar of the vehicle.

9. The seatbelt retractor as claimed in claim 8, wherein in the state that the seatbelt retractor is accommodated in the accommodating space, the spool outer periphery of the spool extends in the longitudinal direction of a vehicle, and the length of the spool outer periphery in the width direction and the length of the accommodating space in the longitudinal direction of the vehicle are equal to each other.

10. The seatbelt retractor as claimed in claim 1, wherein the seatbelt retractor is adapted to be accommodated in an accommodating space in a seat of a vehicle.

11. The seatbelt retractor as claimed in claim 10, wherein in the state that the seatbelt retractor is accommodated in the accommodating space, the spool outer periphery of the spool extends in the longitudinal direction of a vehicle, and the length of the spool outer periphery in the width direction and the length of the accommodating space in the longitudinal direction of the vehicle are equal to each other.

12. A seatbelt apparatus comprising:
   a seatbelt retractor, and
   a seatbelt to be worn by a vehicle occupant seated in a seat,
   wherein the seatbelt retractor comprises:
   a spool formed into a hollow cylindrical shape and capable of winding the seatbelt onto a spool outer periphery or unwinding the seatbelt from the spool outer periphery;
   a motor accommodated in a cylindrical space of the spool and capable of rotating the spool in the belt winding direction or the belt unwinding direction;

a motor speed-reduction mechanism configured to reduce the rotational speed of the motor via a plurality of gears between the driving shaft of the motor and the spool; and a control mechanism configured to control the operation of the motor, wherein a motor housing of the motor extends in the width direction of the spool outer periphery such that the axial direction of the motor coincides with the width direction of the spool outer periphery, and wherein the ratio of the outside diameter D1 of the motor housing relative to the outside diameter D2 of the spool outer periphery of the spool, (D1/D2), is 0.8 or less.

13. A vehicle, comprising:

a seatbelt apparatus with a seatbelt retractor and a seatbelt to be worn by a vehicle occupant seated in a seat, wherein the seatbelt retractor comprises:

a spool formed into a hollow cylindrical shape and capable of winding the seatbelt onto a spool outer periphery or unwinding the seatbelt from the spool outer periphery;

a motor accommodated in a cylindrical space of the spool and capable of rotating the spool in the belt winding direction or the belt unwinding direction;

a motor speed-reduction mechanism configured to reduce the rotational speed of the motor via a plurality of gears between the driving shaft of the motor and the spool; and a control mechanism configured to control the operation of the motor, wherein a motor housing of the motor extends in the width direction of the spool outer periphery such that the axial direction of the motor coincides with the width direction of the spool outer periphery, wherein the ratio of the outside diameter D1 of the motor housing relative to the outside diameter D2 of the spool outer periphery of the spool, (D1/D2), is 0.8 or less, and wherein the seatbelt apparatus is accommodated in an accommodating space in the vehicle.

* * * * *